United States Patent [19]

Hocking et al.

[11] 4,421,019

[45] Dec. 20, 1983

[54] COOKIE DISPENSING APPARATUS

[75] Inventors: Paul R. Hocking; Jay G. Straight; Henry P. Moore, all of Richmond, Va.

[73] Assignee: Eskimo Pie Corporation, Richmond, Va.

[21] Appl. No.: 408,566

[22] Filed: Aug. 16, 1982

[51] Int. Cl.³ .................. A21C 9/04; A21C 15/00; A23P 1/00; B65G 59/06
[52] U.S. Cl. ................... 99/450.4; 99/450.1; 99/450.7; 221/298; 414/126; 426/274; 426/524
[58] Field of Search ...... 99/450.1, 450.4, 450.5–450.8, 99/450.2, 450.3, 517, 494, 646 R; 221/297, 251, 298, 190; 414/112, 126, 127, 125; 141/169, 173; 53/532, 534; 62/345; 426/274, 275, 516, 524; 425/91

[56] References Cited

U.S. PATENT DOCUMENTS

| | | | |
|---|---|---|---|
| 1,126,194 | 1/1915 | Graham | 221/297 X |
| 1,330,639 | 2/1920 | Leumann | 221/298 |
| 2,739,545 | 3/1956 | Nelson | 426/516 |
| 3,316,860 | 5/1967 | Peterson | 99/450.4 |
| 3,481,282 | 12/1969 | Reynolds | 426/274 |
| 3,978,571 | 9/1976 | Orlando et al. | 414/126 X |
| 4,094,236 | 6/1978 | Holmes et al. | 99/450.4 |
| 4,172,480 | 10/1979 | Ellis | 99/450.4 X |
| 4,194,443 | 3/1980 | Mims | 99/450.4 |
| 4,329,920 | 5/1982 | Rose et al. | 99/450.4 |

Primary Examiner—Timothy F. Simone
Attorney, Agent, or Firm—Beveridge, DeGrandi & Kline

[57] ABSTRACT

An apparatus for the manufacture of frozen confections includes an endless conveyor, a freezing chamber, means for moving the conveyor along a fixed path externally of the freezing chamber and then through the freezing chamber, a downwardly facing extruder nozzle of established cross sectional shape located above the fixed path, an apparatus for dispensing a lowermost cookie from the bottom of a stack of cookies onto a location along the fixed path including a frame, a substantially horizontal block supported by the frame having a vertical aperture therein, means connected to the block for holding the stack of cookies in vertical alignment with the aperture, a horizontal plate means under the block supported by a first moving means mounted on the frame operable to move the plate means between an obstructing position in which the plate obstructs the aperture to a cleared position in which the plate does not obstruct the aperture, a horizontal finger means above the horizontal plate means supported by a second moving means mounted on the frame operable to move the finger means from a closed position in which the finger means obstructs the aperture to an open position in which the finger means does not obstruct the aperture, and a control means operable in timed relation to the conveyor moving means operatively associated with the first and second moving means to move the plate means to its obstructing position while the finger means is in its open position to allow the stack of cookies to be supported by the plate means, then to move the finger means to its closed position to separate the lowermost cookie in the stack from cookies thereabove and to support the cookies thereabove, then to move the plate means to its cleared position to allow the lowermost cookie to drop downwardly, then to return the plate means to its obstructing position, then to move the finger means to its open position to allow the stack of cookies to drop onto the plate means and to continue in a cyclical manner.

14 Claims, 5 Drawing Figures

COOKIE DISPENSING APPARATUS

BACKGROUND OF THE INVENTION

The present invention relates to a cookie dispensing apparatus, particularly suitable for dispensing cookies to be included as part of the assembly of a frozen confection such as an ice cream sandwich.

U.S. Pat. No. 3,481,282 of Richard Roland Reynolds discloses a method and apparatus for making ice cream sandwiches in which a frozen dessert in a plastic, flowable condition is continuously extruded from a downwardly facing extruder nozzle over a conveyor on which wafers have been deposited from an automatic dispenser. In timed relation to the conveyor speed, a severing element is passed through the extruded length of dessert emerging from the nozzle to sever a slice of dessert that falls onto each wafer. The conveyor with wafer and deposited dessert passes through a freezing chamber to solidify the dessert. Optionally, prior to passing through the freezing chamber, a second wafer is placed on the frozen confection to make a sandwich. Additional layers of edible material and wafers can also be provided by the use of the apparatus of U.S. Pat. No. 3,481,282. The disclosure of U.S. Pat. No. 3,481,282 is incorporated herein by reference as is the disclosure of U.S. Pat. No. 2,739,545 referred to therein.

In the apparatus of the Reynolds patent, the wafers are stored in a stack aligned by upright members. Immediately below the upright members is a block having a first vertical passage directly below and aligned with the stack of wafers. The first passage opens into a horizontal bore which in turn opens into a second vertical passage offset from the first passage. A dispensing plate having an orifice the same size as the first and second passages of the dispensing block is adapted to reciprocate in the horizontal bore of the block from a first position in which the lowermost wafer from the stack falls into the orifice in the dispensing plate to a second position in which the orifice in the dispensing plate is in alignment with the second passage in the block to allow the wafer to fall through the second passage in the block. The dispensing plate is actuated by a dispenser actuating cylinder whose operation is timed with reference to the entire assembly line.

The arrangement of the Reynolds patent is suitable for wafers which have smooth finishes and surfaces. However, when the product to be dispensed has an uneven finish or surface such as the surfaces and edges of a wire cut or die cut cookie, the sliding of the cookies against themselves and the apparatus causes problems.

Thus when it is desired to dispense a rough surfaced finished product such as a chocolate chip cookie or the like, the wafer dispenser of the Reynolds patent does not work well.

SUMMARY OF THE INVENTION

The present invention overcomes this problem by providing an apparatus for dispensing a lowermost cookie from the bottom of a stack of cookies including a frame, a substantially horizontal block supported by the frame having a vertical aperture therein, means connected to the block for holding the stack of cookies in vertical alignment with the aperture, a horizontal plate means under the block supported by a first moving means mounted on the frame operable to move the plate means between an obstructing position in which the plate obstructs the aperture to a cleared position in which the plate does not obstruct the aperture, a horizontal finger means above the horizontal plate means supported by a second moving means mounted on the frame operable to move the finger means from a closed position in which the finger means obstructs the aperture to an open position in which the finger means does not obstruct the aperture, and a control means operatively associated with the first and second moving means to move the plate means to its obstructing position while the finger means is in its open position to allow the stack of cookies to be supported by the plate means, then to move the finger means to its closed position to separate the lowermost cookie in the stack from cookies thereabove and to support the cookies thereabove, then to move the plate means to its cleared position to allow the lowermost cookie to drop downwardly, then to return the plate means to its obstructing position, then to move the finger means to the open position to allow the stack of cookies to drop onto the plate means.

Preferably, the block has a top and the top has radial grooves therein extending outwardly from the aperture and the means for holding the cookies in vertical alignment are radially adjustably mounted in the grooves. The means for holding the cookies in vertical alignment can be vertical rods, each rod having a foot which interfits with a groove in the top of the block and which has a slot substantially parallel with the groove, with a fastening means for holding the foot on the block passing through the slot. For round cookies the aperture in the block can suitably be circular.

Preferably the first and second moving means are pneumatic piston and cylinder assemblies. In a preferred embodiment, the cleared position of the plate means is on the opposite side of the block from the open position of the finger means, and the block has two apertures, each aperture having means for holding a stack of cookies in vertical alignment. The plate means obstructs both apertures when in its obstructing position, and the finger means obstructs both apertures when in its closed position.

In a further preferred embodiment the finger means is adjustably mounted on the second moving means whereby the distance between the finger means and the horizontal plate means is adjustably variable. Advantageously the block has a channel therein and the finger means is located in the channel.

The invention is preferably included in an apparatus for the manufacture of frozen confections including an endless conveyor, a freezing chamber, means for moving the conveyor along a fixed path externally of the freezing chamber and thence through the freezing chamber, and a downwardly facing extruder nozzle of established cross sectional shape located above the fixed path, so that the cookie dispenser can dispense a lowermost cookie from the bottom of a stack of cookies onto a location along the fixed path.

BRIEF DESCRIPTION OF THE DRAWINGS

The invention will be better understood by a reading of the following detailed description of a preferred embodiment along with a study of the drawings in which.

DETAILED DESCRIPTION OF A PREFERRED EMBODIMENT

Figure 1:
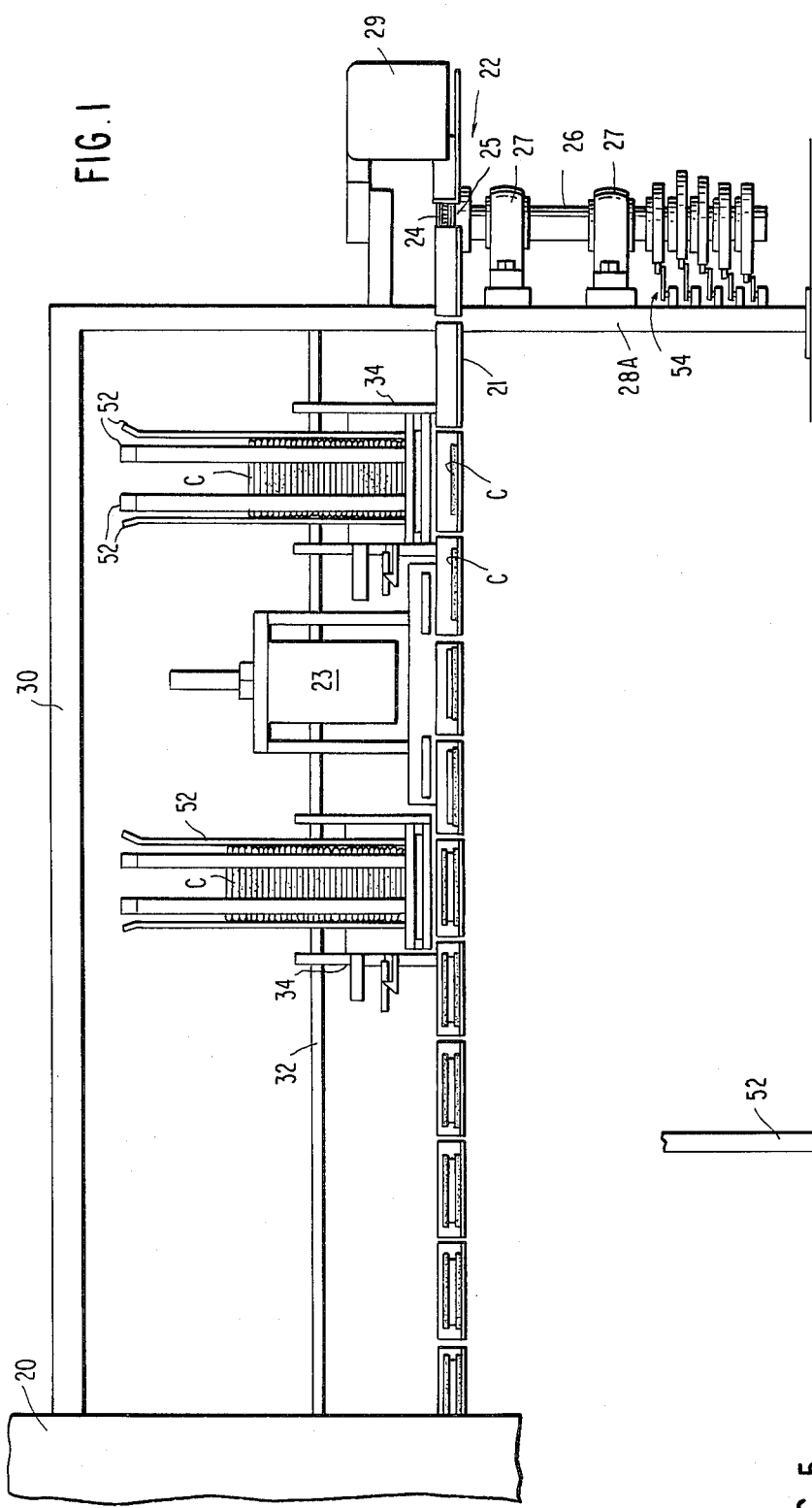
FIG. 1 is a front schematic view of the sandwich making apparatus.

In FIG. 1, reference numeral 20 represents one end of the freezing chamber of the Eskimo Quick Freeze Machine described in U.S. Pat. No. 2,739,545 in which the individual plates 21 of a conveyor 22 enter the freezing chamber 20 along a fixed path after having passed beneath the nozzles of an extruder 23, the endless conveyor 22 spiraling through the freezing chamber 20 and emerging with the confections in a hard frozen condition, the direction of the conveyor being from right to left in FIG. 1. The conveyor plates 21 carried by suitable means, such as chain 24, emerge and are carried away from the freezing chamber along a path not shown in FIG. 1 until the chain engages a gear 25 supported by the vertically disposed drive shaft 26 supported by bearings 27 on the pillar 28a, extending beyond the end portion 20 of the Eskimo machine, to reverse the direction of travel of the conveyor and carry it toward the entrance of the freezing chamber 20. A baffle 29 affixed to the pillar 28a overlies the top of the conveyor plates 21 as they pass around the gear 25 in a position to contact and remove the hardened ice cream bars from the conveyor plates before they are returned to freezing chamber 20.

In FIG. 1 the pillar 28a is tied by way of beam 30 to the Eskimo machine 20 and mounting bars 32 extend between pillar 28a and the Eskimo machine 20.

Figure 2:
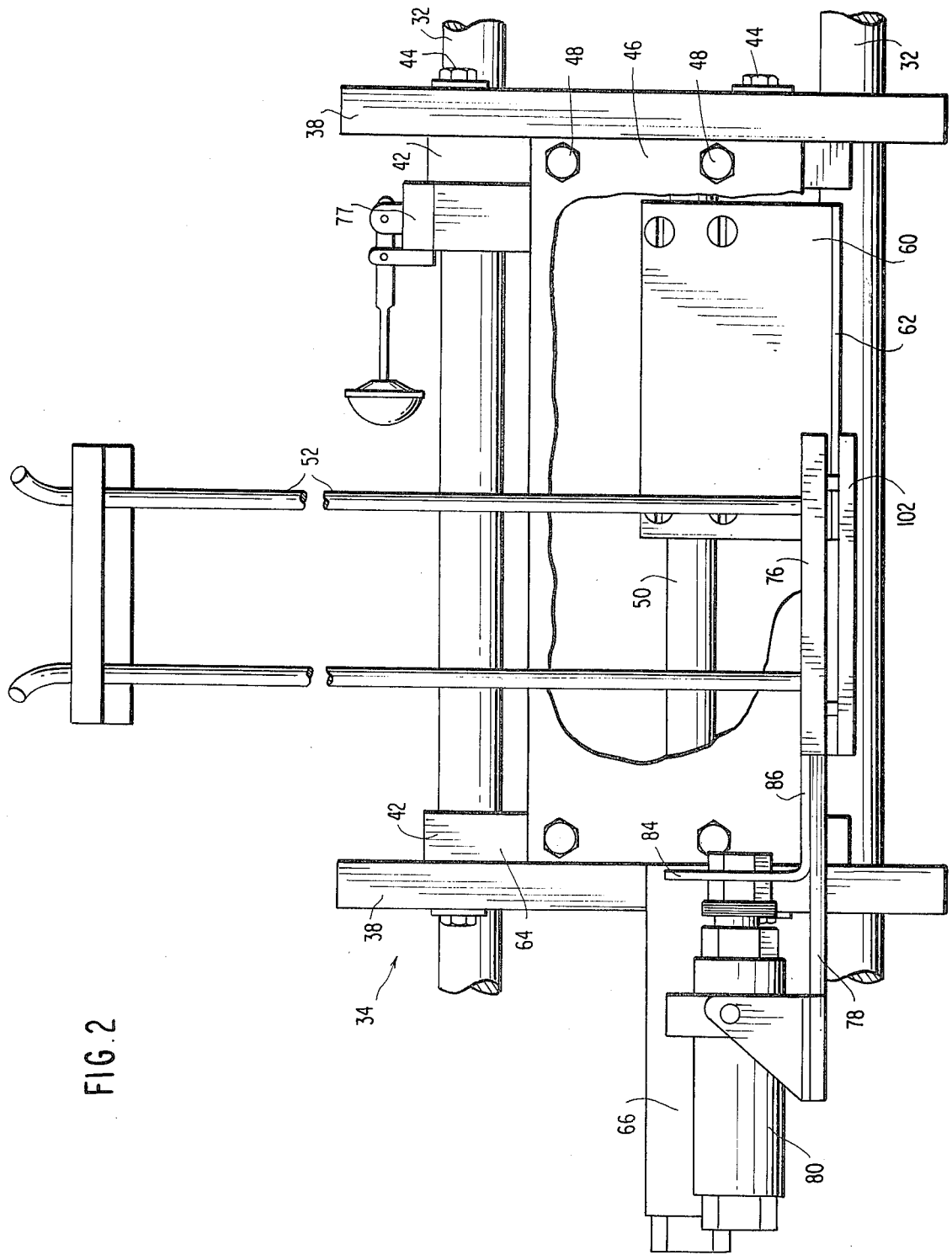
FIG. 2 is a front elevation of the cookie dispenser with a portion thereof broken away.
Figure 3:
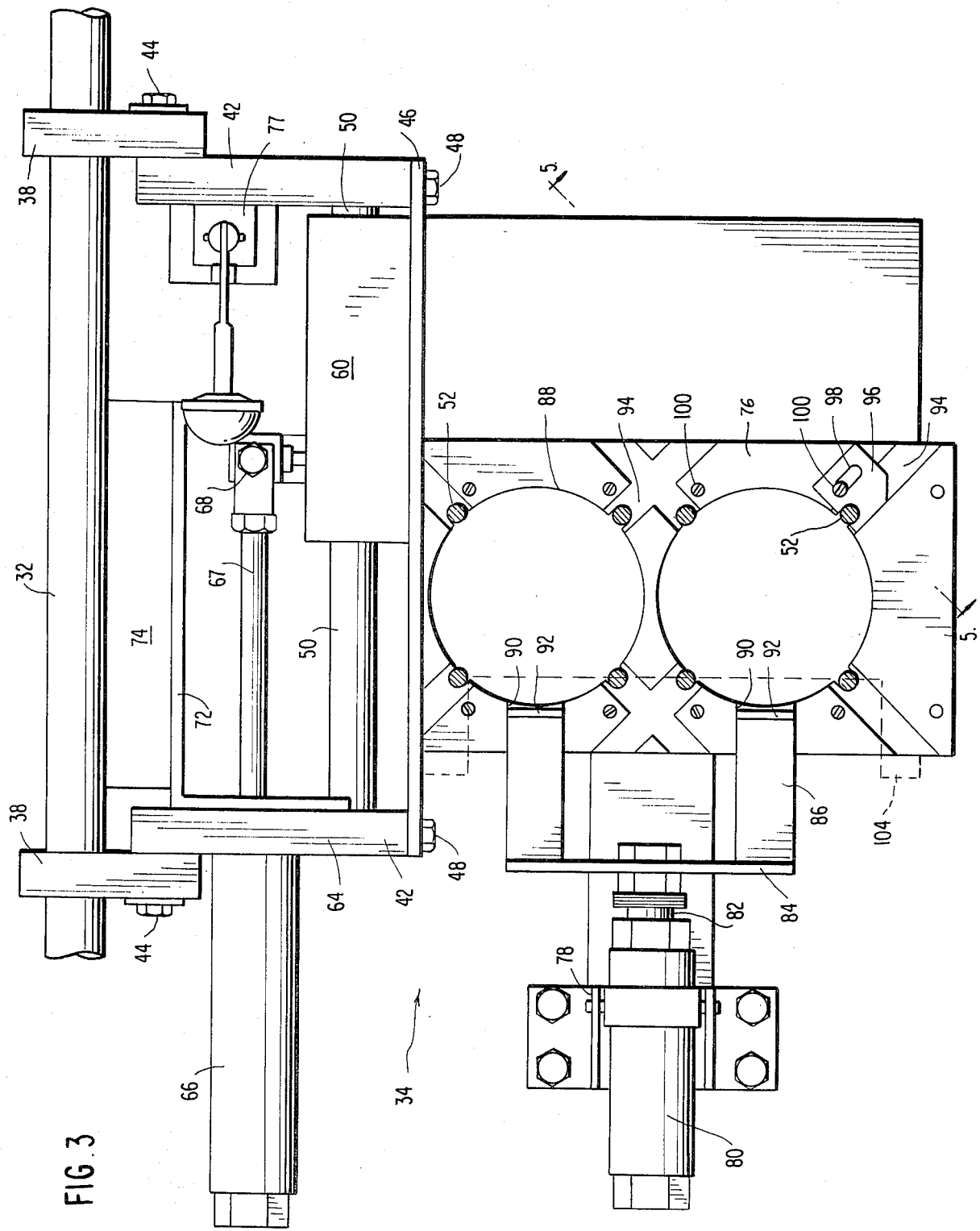
FIG. 3 is a top view of the apparatus of FIG. 2.
Figure 4:
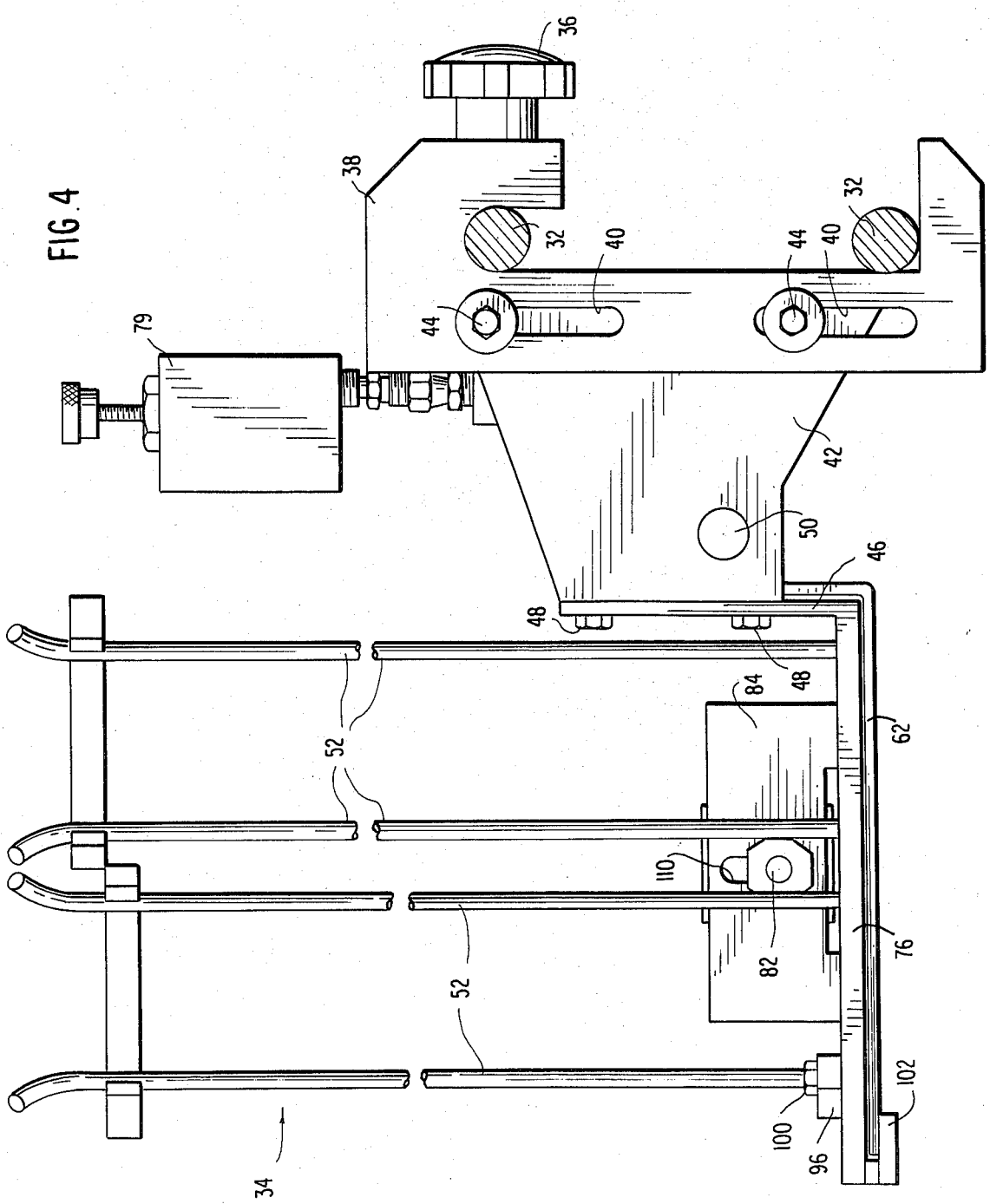
FIG. 4 is an elevational view from the right in FIG. 2.

As seen in FIG. 4 the cookie dispenser 34 includes a frame comprising a pair of C-shaped members 38 which hook over the top bar 32 and under the lower bar 32 and are locked in place by set screw 36. C-shaped members 38 have slots 40 so that side brackets 42 may be securely fastened at a desired height by bolt and nut arrangement 44. Extending between the two side brackets 42 is end plate 46. End plate 46 is rigidly mounted on side brackets 42 by bolts 48. Travel shaft 50 also extends between side brackets 42. Slide block 60 is arranged for movement on travel shaft 50 from right to left and back as seen in FIGS. 2 and 3. As will be apparent, a suitable anti-friction bearing surface can be provided between travel shaft 50 and slide block 60. Rigidly attached to slide block 60 is drop plate 62 which thereby is adapted for movement along with the slide block 60.

The left side bracket 64 has rigidly mounted thereon a first pneumatic cylinder 66. The piston rod 67 of the cylinder 66 is connected to the slide block 60 by way of a clevis attachment 68 and lateral pin 70 which enters a corresponding opening in slide block 60.

Valve bracket 72 is rigidly connected to the left side bracket 64 and supports valve assembly 74, which serves to control the air cylinders 66 and 80 as will be discussed more thoroughly hereinafter. A second valve assembly 77 is provided for optional manual control.

Rigidly connected to the end plate 46 is a horizontal feed block 76 having a pair of vertical apertures 88 therein. Extending from the feed block 76 is a bracket 78 which supports second pneumatic cylinder 80. The piston rod 82 of second air cylinder 80 is connected to a hand bracket 84 having two fingers 86 laterally extending from the bottom thereof. Each finger 86 is thereby adapted for movement between an open position as seen in FIG. 3 and a closed position in which the fingers are to the right in FIG. 3 and obstruct apertures 88 in feed block 76.

As can be seen most clearly in FIG. 4 the elevation of the fingers 86 with respect to the feed block 76 can be adjusted by adjusting the hand bracket 84. The bracket 84 is provided with a vertical slot 110 allowing bracket 84 to be clamped onto the piston rod 82 at various levels, thereby causing the resulting elevation of the fingers 86 to be adjusted correspondingly. Therefore, the elevation of the fingers 86 can be modified to compensate for different thicknesses of cookies supported on drop plate 62.

Preferably feed block 76 is provided with radial channels 90 in its top surface in which the fingers 86 are provided for movement. Additionally, it is preferred that the tips 92 of fingers 86 be provided with tapered edges to provide easy insertion between two cookies of a stack.

Figure 5:
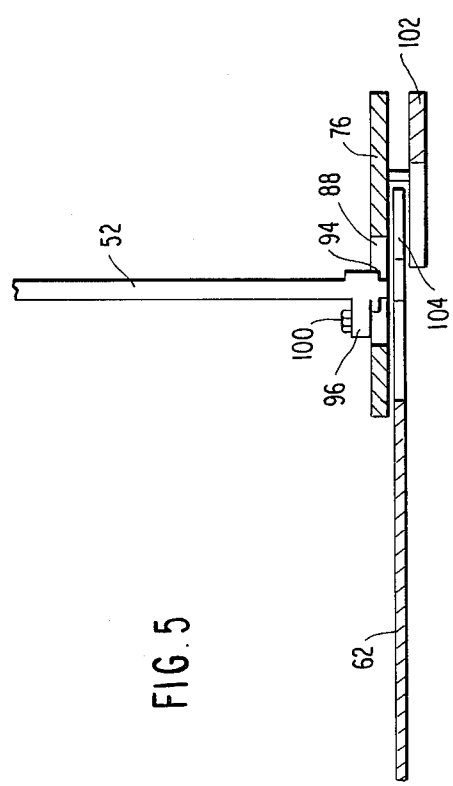
FIG. 5 is a sectional view taken along lines 5—5 looking in the direction of the arrows in FIG. 3.

The feed block 76 is provided with radial grooves 94 in which are mounted adjustable vertical guide bars 52. Only one of the vertical guide bars 52 is shown adjustable for clarity of illustration, as seen in FIG. 3, although it will be apparent that all of the guide bars can be so adjusted. As best seen in FIGS. 3 and 5 the guide bar 52 is provided with a foot 96 having a slot 98 generally parallel with the groove 94. A screw 100 through slot 98 locks the foot 96 to the feed block 76 at the desired radial location.

As best seen in FIGS. 4 and 5, the feed block 76 is provided with a depending ledge 102 on which the terminal edge of drop plate 62 rides. Additionally drop plate 62 is provided with an ear 104 extending from each end thereof in the direction of second air cylinder 80.

The air cylinders 66 and 80 are connected through valve assemblies 74 and 77 to multi-contact switch 54 actuated by conveyor drive shaft 26 to control the timing of the operation of the apparatus as will be apparent to those of ordinary skill. For clarity of illustration, the connecting air lines have been omitted from the drawings but it will be apparent that an air pressure supply and appropriate connecting lines are provided to operate the cylinders. Pressure and flow rates can be adjusted with flow control valve 79.

The operation of the apparatus is straightforward. Once the desired cookie size is ascertained, the vertical guide bars 52 are adjusted in their respective grooves 94 so as to provide support for the periphery of the cookies in the stack to keep them aligned with their respective aperture 88. The hand bracket 84 is mounted on piston rod 82 so that the spacing between fingers 86 and drop plate 62 is the same as the thickness of one cookie.

A stack of cookies C is then inserted between the vertical guide bars 52 and allowed to rest on drop plate 62 in its obstructing position as shown in phantom in FIG. 3. At this point the fingers 86 are in their open position, as shown in FIG. 3. Then the air cylinder 80 is actuated to cause its piston rod 82 to move fingers 86 to the right to their closed position, with the tapered tips 92 separating the lowermost cookie from the remaining cookies in the stack.

When fingers 86 have been moved to the right as seen in FIG. 3, they pass over the lowermost cookie and support all of the other cookies in the stack.

First air cylinder 66 is then actuated to cause its piston rod to move slide block 60 and drop plate 62 to the cleared position as seen in FIG. 2, causing the lowermost cookies thereon to fall out onto plates 21 of conveyor 22. The cookies do not move with the plate 62 as they are restrained from lateral motion by block 76. Drop plate 62 is then reciprocated back to its obstructing position underneath of feed block 76 by retracting the piston rod of cylinder 66.

The stack of cookies on fingers 86 is then allowed to drop onto drop plate 62 by the retraction of fingers 86 caused by the withdrawal of piston rod 82 into second air cylinder 80. Then the second air cylinder 80 extends its piston rod again to separate the new lowermost cookie from the remaining cookies in the stack and the cycle is ready to be repeated when the next plate 21 is in position.

It will be apparent that when using wire cut or die cut cookies having uneven finishes or surfaces the present invention provides substantial advantages in that the cookie itself undergoes very little movement and such movement as takes place is without substantial tension or pressure thereon, thereby minimizing crumbling and breakage.

What is claimed is:

1. An apparatus for dispensing a lowermost cookie from the bottom of a stack of cookies comprising
    a frame,
    a substantially horizontal block supported by said frame having a vertical aperture therein,
    means connected to said block for holding said stack of cookies in vertical alignment with said aperture,
    a horizontal plate means under said block supported by a first moving means mounted on said frame operable to move said plate means between an obstructing position in which said plate obstructs said aperture to a cleared position in which said plate does not obstruct said aperture,
    a horizontal finger means above said horizontal plate means supported by a second moving means mounted on said frame operable to move said finger means from a closed position in which said finger means obstructs said aperture to an open position in which said finger means does not obstruct said aperture, and
    a control means operatively associated with said first and second moving means to move said plate means to its obstructing position while said finger means is in its open position to allow said stack of cookies to be supported by said plate means, then to move said finger means to its closed position to separate the lowermost cookie in the stack from cookies thereabove and to support the cookies thereabove, then to move said plate means to its cleared position to allow said lowermost cookie to drop downwardly, then to return said plate means to its obstructing position, then to move said finger means to said open position to allow saidstack of cookies to drop onto said plate means.

2. An apparatus as claimed in claim 1 in which said aperture is circular.

3. An apparatus as claimed in claim 1 in which said block has a top and said top has radial grooves therein extending outwardly from said aperture and said means for holding said cookies in vertical alignment are radially adjustably mounted in said grooves.

4. An apparatus as claimed in claim 3 in which said means for holding said cookies in vertical alignment comprise vertical rods, each rod having a foot which interfits with a radial groove and has a slot substantially parallel with said groove, and a fastening means for holding said foot on said block passing through said slot.

5. An apparaatus as claimed in claim 4 in which said aperture is circular.

6. An apparatus as claimed in claim 1 in which said first and second moving means comprise pneumatic piston and cylinder assemblies.

7. An apparatus as claimed in claim 1 in which said cleared position of said plate means is on the opposite side of said block from said open position of said finger means.

8. An apparatus as claimed in claim 1 in which said block has two apertures, each aperture has means for holding a stack of cookies in vertical alignment, said plate means obstructs both apertures when in its obstructing position, and said finger means obstructs both apertures when in its closed position.

9. An apparatus as claimed in claim 1 wherein said finger means is adjustably mounted on said second moving means whereby the distance between said finger means and said horizontal plate means is adjustably variable.

10. An apparatus as claimed in claim 9 wherein said block has a channel therein and said finger means is located in said channel.

11. In an apparatus for the manufacture of frozen confections including an endless conveyor, a freezing chamber, means for moving said conveyor along a fixed path externally of said freezing chamber and thence through said freezing chamber, a downwardly facing extruder nozzle of established cross sectional shape located above said fixed path wherein the improvement comprises,
    an apparatus for dispensing a lowermost cookie from the bottom of a stack of cookies onto a location along said fixed path including a frame,
    a substantially horizontal block supported by said frame having a vertical aperture therein,
    means connected to said block for holding said stack of cookies in vertical alignment with said aperture,
    a horizontal plate means under said block supported by a first moving means mounted on said frame operable to move said plate means between an obstructing position in which said plate obstructs said aperture to a cleared position in which said plate does not obstruct said aperture,
    a horizontal finger means above said horizontal plate means supported by a second moving means mounted on said frame operable to move said finger means from a closed position in which said finger means obstructs said aperture to an open position in which said finger means does not obstruct said aperture, and
    a control means operable in timed relation to said conveyor moving means operatively associated with said first and second moving means to move said plate means to its obstructing position while said finger means is in its open position to allow said stack of cookies to be supported by said plate means, then to move said finger means to its closed position to separate the lowermost cookie in the stack from cookies thereabove and to support the cookies thereabove, then to move said plate means to its cleared position to allow said lowermost cookie to drop downwardly, then to return said plate means to its obstructing position, then to move said finger means to said open position to allow said stack of cookies to drop onto said plate means.

12. An apparatus as claimed in claim 11 wherein said aperture is circular, said block has a top and said top has radial grooves therein extending downwardly from said aperture and said means for holding said cookies in vertical alignment are vertical rods radially adjustably mounted in said grooves, said each rod having a foot which interfits with a said groove and which has a slot substantially parallel with said groove, and a fastening means for retaining said foot on said plate passing through said slot.

13. An apparatus as claimed in claim 11 wherein said finger means is adjustably mounted on said second moving means whereby the distance between said finger means and said horizontal plate means is adjustably variable.

14. An apparatus as claimed in claim 13 wherein said block has a channel therein and said finger means is located in said channel.

* * * * *